US010871877B1

(12) United States Patent
Clediere

(10) Patent No.: US 10,871,877 B1
(45) Date of Patent: Dec. 22, 2020

(54) CONTENT-BASED CONTEXTUAL REACTIONS FOR POSTS ON A SOCIAL NETWORKING SYSTEM

(71) Applicant: Facebook, Inc., Menlo Park, CA (US)

(72) Inventor: Robin Maxime Clediere, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/206,852

(22) Filed: Nov. 30, 2018

(51) Int. Cl.
*G06F 3/0482* (2013.01)
*G06F 3/0481* (2013.01)
*G06F 16/9536* (2019.01)
*G06N 20/00* (2019.01)
*G06F 40/279* (2020.01)

(52) U.S. Cl.
CPC ........ *G06F 3/04817* (2013.01); *G06F 3/0482* (2013.01); *G06F 16/9536* (2019.01); *G06F 40/279* (2020.01); *G06N 20/00* (2019.01)

(58) Field of Classification Search
CPC .................................................. G06F 3/04817
USPC ......................................................... 715/753
See application file for complete search history.

(56) References Cited

U.S. PATENT DOCUMENTS

| | | | | |
|---|---|---|---|---|
| 9,043,196 B1* | 5/2015 | Leydon | ............... | G06F 3/04842 704/4 |
| 9,294,583 B1* | 3/2016 | Sherrets | ............. | G06Q 30/0261 |
| 9,652,473 B2* | 5/2017 | Aitchison | ........... | G06F 16/9537 |
| 10,021,059 B1* | 7/2018 | Rao | .......................... | G06F 21/10 |
| 2009/0119584 A1* | 5/2009 | Herbst | .................. | G06F 16/367 715/273 |
| 2010/0030798 A1* | 2/2010 | Kumar | .................. | G06F 16/954 707/737 |
| 2010/0179991 A1* | 7/2010 | Lorch | ..................... | H04L 51/10 709/206 |
| 2012/0163707 A1* | 6/2012 | Baker | ............... | G06K 9/00456 382/159 |
| 2012/0331063 A1* | 12/2012 | Rajaram | ................ | G06Q 50/01 709/206 |
| 2013/0035982 A1* | 2/2013 | Zhang | .................... | G06Q 50/01 705/7.29 |
| 2013/0159919 A1* | 6/2013 | Leydon | ................... | H04W 4/18 715/780 |
| 2013/0273976 A1* | 10/2013 | Rao | ..................... | H04L 12/1822 455/563 |
| 2013/0295956 A1* | 11/2013 | Ding | ....................... | H04L 67/22 455/456.1 |
| 2013/0297547 A1* | 11/2013 | Ding | ........................ | G06N 5/02 706/46 |
| 2014/0025692 A1* | 1/2014 | Pappas | .................... | G06F 16/00 707/754 |

(Continued)

*Primary Examiner* — Daniel Rodriguez
(74) *Attorney, Agent, or Firm* — Fenwick & West LLP

(57) ABSTRACT

A social networking system allows users to more easily and appropriately react to posts made by other users. A post—including its text, photos, and/or location—is analyzed to determine one or more contexts of the post. Supervised machine learning techniques may be employed to determine the contexts of posts. Based on the context(s) of the post, a contextual reaction icon is selected for inclusion in the options of reactions from which users can select. A post can have multiple contextual reactions. The contextual reactions for a post may change over time as comments are made to the post or the content of the post is otherwise altered.

18 Claims, 6 Drawing Sheets

(56) References Cited

U.S. PATENT DOCUMENTS

| | | | |
|---|---|---|---|
| 2014/0088954 A1* | 3/2014 | Shirzadi | G06F 40/166 704/9 |
| 2014/0129625 A1* | 5/2014 | Haugen | G06Q 50/01 709/204 |
| 2014/0244622 A1* | 8/2014 | Lindsay | G06F 16/334 707/722 |
| 2014/0280553 A1* | 9/2014 | Hernandez | H04W 4/023 709/204 |
| 2015/0100537 A1* | 4/2015 | Grieves | G06N 5/048 706/52 |
| 2015/0127813 A1* | 5/2015 | Li | H04L 67/22 709/224 |
| 2015/0242447 A1* | 8/2015 | Ipeirotis | G06Q 30/0246 705/14.45 |
| 2015/0268818 A1* | 9/2015 | Zewail | G06Q 10/10 715/765 |
| 2015/0302338 A1* | 10/2015 | Zaveri | H04L 51/046 705/7.39 |
| 2015/0331550 A1* | 11/2015 | Wang | G06F 3/04842 715/771 |
| 2016/0117384 A1* | 4/2016 | Akavaram | H04L 51/16 707/738 |
| 2016/0224673 A1* | 8/2016 | Hebert | H04W 4/12 |
| 2016/0302030 A1* | 10/2016 | White | G06Q 30/0208 |
| 2016/0366080 A1* | 12/2016 | Bastide | H04L 51/12 |
| 2016/0379123 A1* | 12/2016 | Younessian | G06Q 30/0282 706/52 |
| 2017/0052946 A1* | 2/2017 | Gu | H04L 51/046 |
| 2017/0075878 A1* | 3/2017 | Jon | G06F 40/274 |
| 2017/0103179 A1* | 4/2017 | Jiao | G16H 10/20 |
| 2017/0147185 A1* | 5/2017 | Milvaney | G06F 3/0482 |
| 2017/0177564 A1* | 6/2017 | Rottmann | G06F 40/40 |
| 2017/0185581 A1* | 6/2017 | Bojja | G06F 40/242 |
| 2017/0213007 A1* | 7/2017 | Moturu | G16H 40/20 |
| 2017/0220580 A1* | 8/2017 | Chi | G06F 16/90328 |
| 2017/0286521 A1* | 10/2017 | Singh | H04L 63/1425 |
| 2017/0300823 A1* | 10/2017 | Bostick | G06N 5/022 |
| 2018/0097763 A1* | 4/2018 | Garcia | G06Q 30/06 |
| 2018/0107945 A1* | 4/2018 | Gao | G06N 20/00 |
| 2018/0123997 A1* | 5/2018 | Celedonia | G06Q 10/10 |
| 2018/0197575 A1* | 7/2018 | Doherty | G06F 3/0485 |
| 2018/0246983 A1* | 8/2018 | Rathod | G06F 16/9535 |
| 2018/0300542 A1* | 10/2018 | Waddell | H04L 51/066 |
| 2018/0336184 A1* | 11/2018 | Bellegarda | G06F 40/30 |
| 2018/0356957 A1* | 12/2018 | Desjardins | H04L 51/10 |
| 2019/0025939 A1* | 1/2019 | Patel | G06F 3/04817 |
| 2019/0056841 A1* | 2/2019 | Fernandez | H04L 67/06 |
| 2019/0087466 A1* | 3/2019 | Wang | G06F 3/04817 |
| 2019/0149501 A1* | 5/2019 | Bastide | G06F 40/30 709/206 |
| 2019/0179955 A1* | 6/2019 | Geyer | G06N 20/10 |
| 2019/0208370 A1* | 7/2019 | Brunn | H04L 51/16 |
| 2019/0258381 A1* | 8/2019 | Desjardins | H04L 51/04 |
| 2019/0258719 A1* | 8/2019 | Baker | G06F 40/53 |
| 2019/0311189 A1* | 10/2019 | Bryant | G06F 3/0482 |
| 2019/0319898 A1* | 10/2019 | Scanlon | H04L 51/02 |
| 2019/0325034 A1* | 10/2019 | Morrison | G06F 16/24578 |
| 2020/0112533 A1* | 4/2020 | Anders | H04L 12/1813 |
| 2020/0143113 A1* | 5/2020 | Baldwin | G06F 16/335 |
| 2020/0143482 A1* | 5/2020 | Rakshit | G06F 16/5866 |

\* cited by examiner

CONTENT-BASED CONTEXTUAL REACTIONS FOR POSTS ON A SOCIAL NETWORKING SYSTEM

FIELD OF ART

This disclosure generally relates to social networking systems, and more specifically to facilitating user interactions with respect to content of posts by provision of contextual reaction options.

BACKGROUND

Users of a social networking system may use the system to share posts, which may contain or reference text, images, videos, events, locations, other users, comments, or some combination thereof. Other users who view the content of a post may wish to respond to the content posted by the user who shared the post. In conventional forms of social media, users may respond to a post by commenting on it (i.e., entering a textual message) or reacting to it (i.e., selecting an icon associated with a reaction from a set of predefined icons). However, a small set of predetermined types of common reactions to a social media post may not capture the significance of the content of the post. Conversely, providing a user with a set of all possible reactions may overwhelm the user, leading the user to not specify a reaction at all. Thus, in many cases users miss out on the opportunity to appropriately express their interest in a post with a reaction.

SUMMARY

A social networking system allows users to share posts with other users of the social networking system. A post has post content and is associated with a user who created the post. The post content may include or reference text, images, videos, events, locations, or other content able to be shared by the social networking system. When a user submits a post, the post is analyzed by the social networking system. Based on the analysis of the content of the post, one or more contextual reaction options may be made available to users of the social networking system. The contextual reaction (s) reflect the content of the post, allowing other users to more appropriately and precisely react to the post.

As other users make comments on the post or the post is otherwise subsequently altered, the new content associated with the post is analyzed and may result in new reaction options being made available to users. Contextual reaction s may also be available for reacting to comments on the comment's parent post, as well as for reacting to the post itself. The contextual reaction options available for selection for comments may be the same as or different from the options for the parent post.

DETAILED DESCRIPTION

Figure 1:
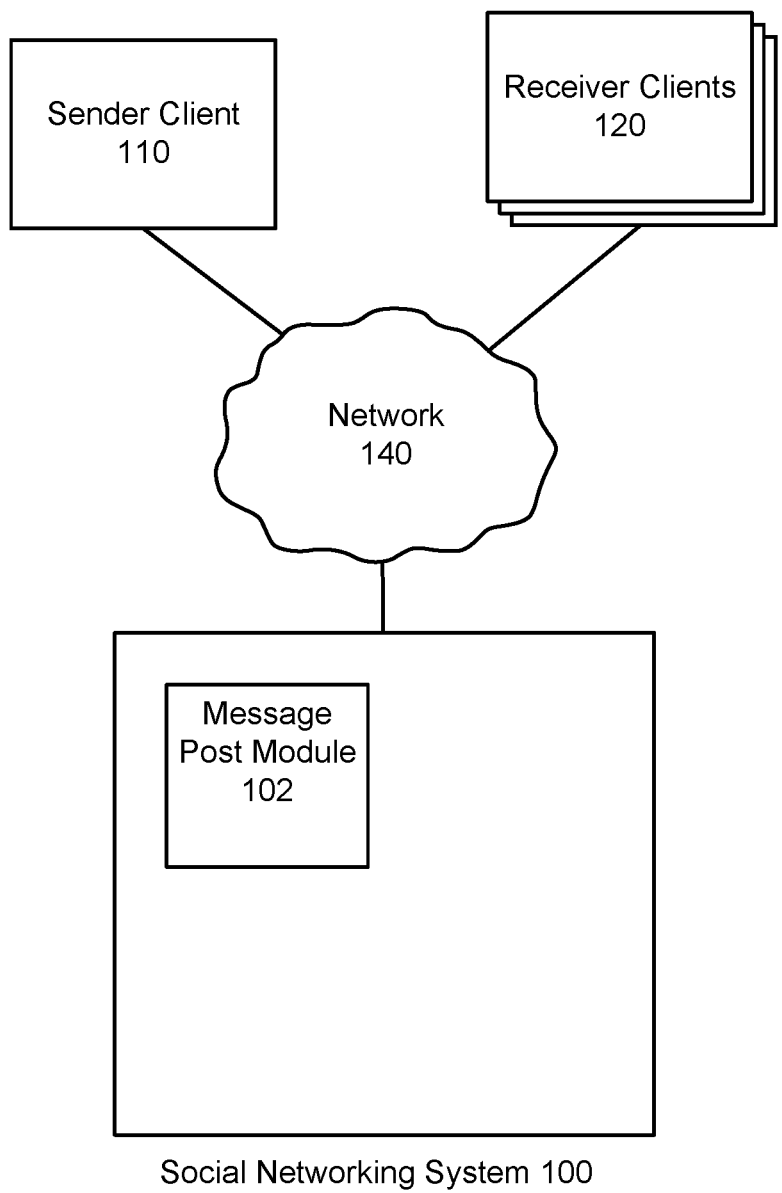
FIG. 1 is a block diagram of a system environment in which a sender client, receiver client(s), and a social networking system operate, in accordance with an embodiment of the invention.

FIG. 1 is a block diagram of a system environment in which a sender client 110, receiver client(s) 120, and a social networking system 140 operate, in accordance with an embodiment of the invention. The sender client 110 and receiver clients 120 are computing devices that are connected to the network 140. The social networking system 100 includes at least a message post module 102, and is also connected to the network 140.

The sender client 110 interacts with the social networking system 100 to send electronic messages (hereinafter referred to for simplicity as "posts") via the network 140. The receiver clients 120 interact with the social networking system 100 to view and respond to the post. The sender client 110 can also view and respond to the post. Responding to the post may include reacting to the post, such as by selecting contextual reaction icons to include within the response.

A particular user with a client device may create and/or view one or more posts. That is, the same client device may be a sender client 110 in one instance and a receiver client 120 in another instance. The social networking system 100 stores a plurality of posts made via the network 140 by a plurality of users. The social networking system 100 also provides the posts for viewing to the users via the network 140.

The message post module 102 of the social networking system 100 allows the sender client 110 and receiver clients 120 to send, view, and respond to posts by storing and processing posts. The processing of posts may further include analyzing the post content and making available one of more contextual reactions based on the analysis. The message post module 102 is discussed in further detail in relation to FIG. 3.

The sender client 110 and the receiver clients 120 are computing devices capable of receiving user input as well as transmitting and/or receiving data via the network 140. Possible examples of the sender client 110 and the receiver clients 120 include desktop or laptop computers, personal digital assistants (PDAs), mobile telephones, smartphones, head-mounted displays (HMDs), or virtual reality (VR) or augmented reality (AR) devices.

The sender client 110 and the receiver clients 120 are configured to communicate via the network 140, and may include electronic displays, keyboards, cameras, microphones, speakers, and/or other components that enable users to interact with the network 140. These components may also be external devices communicatively coupled to the sender client 110 and/or the receiver clients 120.

The network 140 includes any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

Figure 2A:
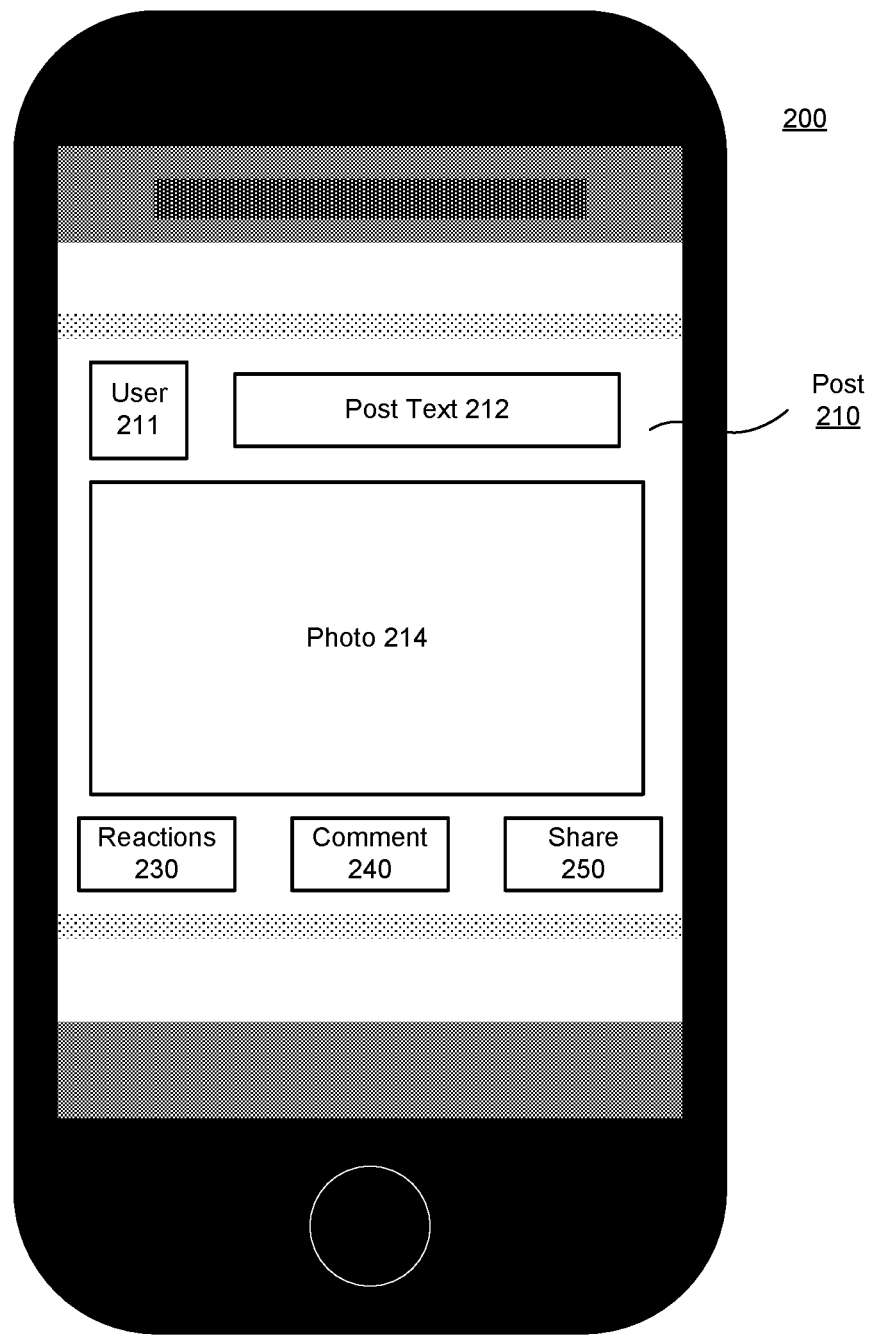
FIG. 2A shows an example user interface, presented to the user by the social networking system, from which users will be able to interact with a post, in accordance with an embodiment of the invention.

FIG. 2A shows an example user interface, presented to the user by the social networking system, from which users will be able to interact with a post, in accordance with an embodiment of the invention. The interface 200 is displayed on both the sender client 110 and the receiver client 120. In the embodiment shown in FIG. 2A, the interface 200 displays a post 210, e.g., as part of an instant messaging application. The post 210 may include an identifier (e.g., an image or username) of a user 211 who used the sender client 110 to send the post, post text 212, one or more images 214 (e.g., a photo), as well as options for reactions 230, comments 240, and sharing 250. The embodiment of FIG. 2A is shown on a mobile device. However, the interface 200 may be displayed in a similar manner on any of the types of client devices previously discussed.

The post text 212 may include a plurality of statements, mentions of other users, and/or tags corresponding to a specific location, business, or event. Each image 214 included in the post 210 may also include a textual description of the image, as well as tags of other users, locations, businesses, or events related to the image. The content included in the post (e.g., the post text 212 and image 214) is analyzed when determining contextual reactions. This process will be discussed in greater detail with respect to FIG. 4.

The reactions 230, comment 240, and share 250 user interface items may be selected by a user, such as a user of the sender client 110 or receiver clients 120. Each item has different functionality when selected. When a user selects share 250, the interface 200 provides the user the option to "share" the content of the post—that is, to re-post the content of the post with the option for the sharing user to add content to the post. For example, a user may select the share 250 item in the interface 200 shown in FIG. 2A. When shared, the post 210—including the post text 212, image 214, and an indication of the identity of the sender client 110—will be re-posted by the sharing user. The sharing user may add content to the shared post, such as new text, new image(s), a new location, hyperlink(s) to other users, businesses, or other content compatible with the social networking system 100.

When a user selects the comment item 240, an interface 200 is provided for associating a comment with the post 210 (e.g., a text box for typing a comment). Comments made on the post 210 may be viewed by other users of the social networking system. Comments are displayed in conjunction with the original post 210. The comments typically include an identity of the commenting user (e.g., profile image or username), content such as text or image, and options for other users to react to or reply to the comment. In some embodiments of the invention, comments may have their own contextual reactions that are specific to the comments (e.g., based on the content of the comments). In some embodiments, the contextual reaction options available on the post 210 may be updated based on the content of the comments to the post.

Figure 2B:
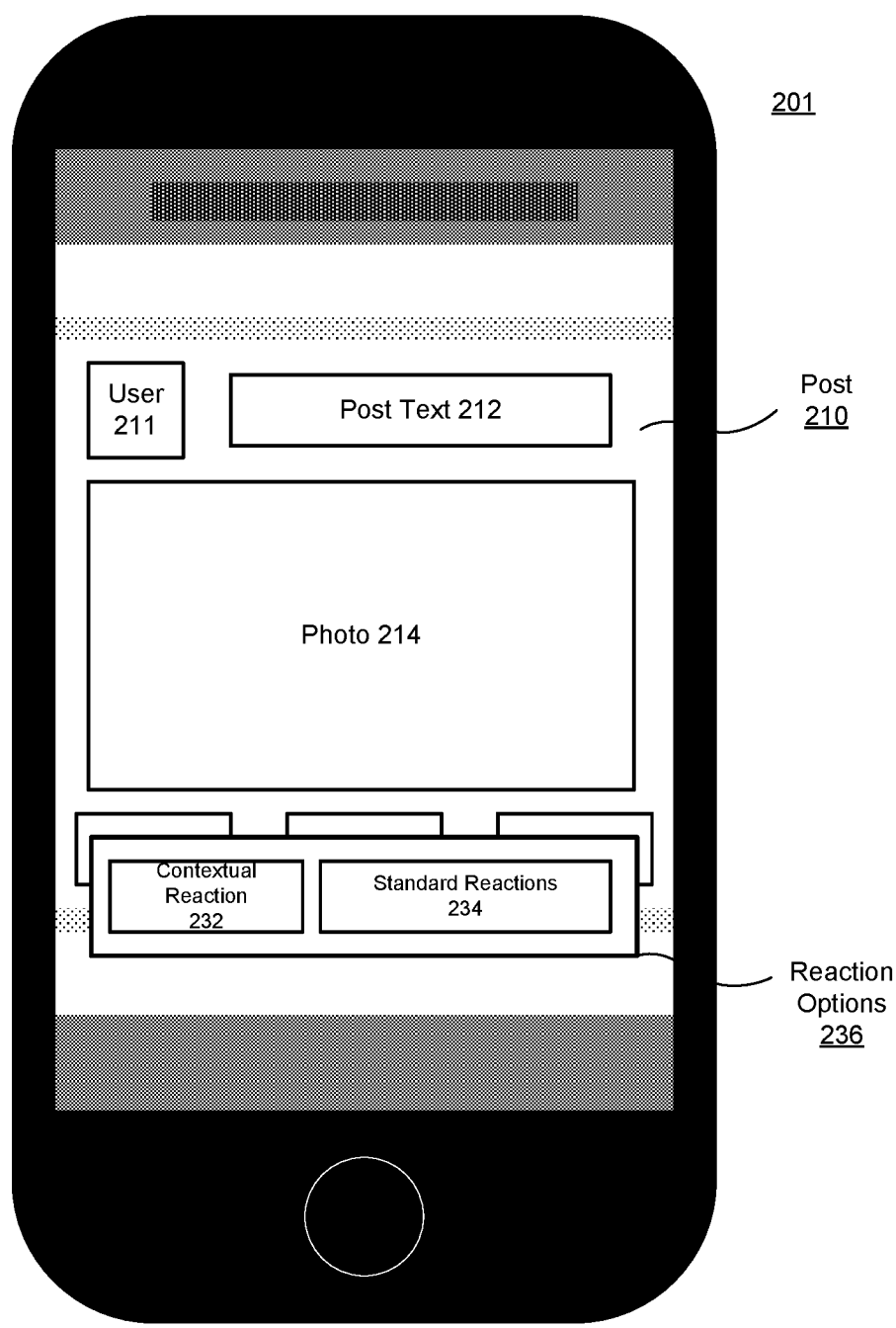
FIG. 2B shows an example user interface, presented to the user by the social networking system, from which users will be able to select a reaction to a post, in accordance with an embodiment of the invention.

FIG. 2B shows an example user interface, presented to the user by the social networking system, from which users will be able to select a reaction to a post, in accordance with an embodiment of the invention. The options for the possible reactions are made available in the user interface, e.g., as a visual indicator such as an icon. In some embodiments, the reactions additionally have an associated textual label (such as the string "basketball" for a reaction corresponding to the topic of the sport basketball). The interface 200 of FIG. 2B is shown after the user selects reactions 230 from the interface 200 of FIG. 2A. When the user selects reactions 230, a store of reaction options 236 from which the user can select are displayed as shown in FIG. 2B. For example, the reaction options 236 may appear over top of the other interface icons, as shown in FIG. 2B. In other embodiments of the user interface, the reaction options 236 may appear with the interface icons without the user having to select reactions 230. That is, reaction options 236 appear with the interface icons instead of reactions 230. The reaction options 236 include contextual reactions 232 as well as standard reactions 234.

The standard reactions 234 are a set of reactions available for all posts and comments on the social networking system. In some embodiments, this includes options with labels such as "like," "love," "haha," "wow," "sad," and "angry." Each standard reaction 234 has a corresponding icon that depicts an illustration or animation of the reaction. For example, the reaction with the label "like" may correspond to an icon depicting a thumbs-up that is animated and bounces up and down. Further, when the user hovers over or otherwise designates the icon, a text description appears above the icon that reads the label "like." When the user selects the "like" reaction, a smaller version of the icon appears at the bottom of the post 210 to show that someone has "liked" the post 210.

The contextual reactions 232 are based on the content of the post 210 or, in some embodiments, other information associated with the post. The content of the post 210 is analyzed by the message post module 102, which is discussed in greater detail with respect to FIG. 3. In some embodiments, the content of the post used in the analysis includes the post text 212 and the image 214, as well as any additional content related to the post such as location, events, content of comments, and other social media content contained in the post. Similar to the standard reactions 234, the contextual reactions each have an associated contextual reaction icon. The contextual reaction icon may be still or animated. In some embodiments, the contextual reaction icon has a label, which is a textual description of the reaction. In the embodiment shown in FIG. 2B the contextual reactions 232 appear more prominently than the standard reactions 234 in the store of reactions options 236 that appears to the user when the user selects reaction 230.

In one example of this embodiment, a user 211 makes a post 210 while attending a basketball game. The post 210 includes the content of an image 214 (e.g., a photo) of the user and friends in the stands, a tagged location indicating Madison Square Garden (the location of the stadium), and post text 212 "Go Knicks!" The user 211 submits this post to the social networking system and it is displayed to users (e.g., friends or other connections of the user) on the social networking system's user interface 200 in the manner shown in FIG. 2A.

Figure 3:
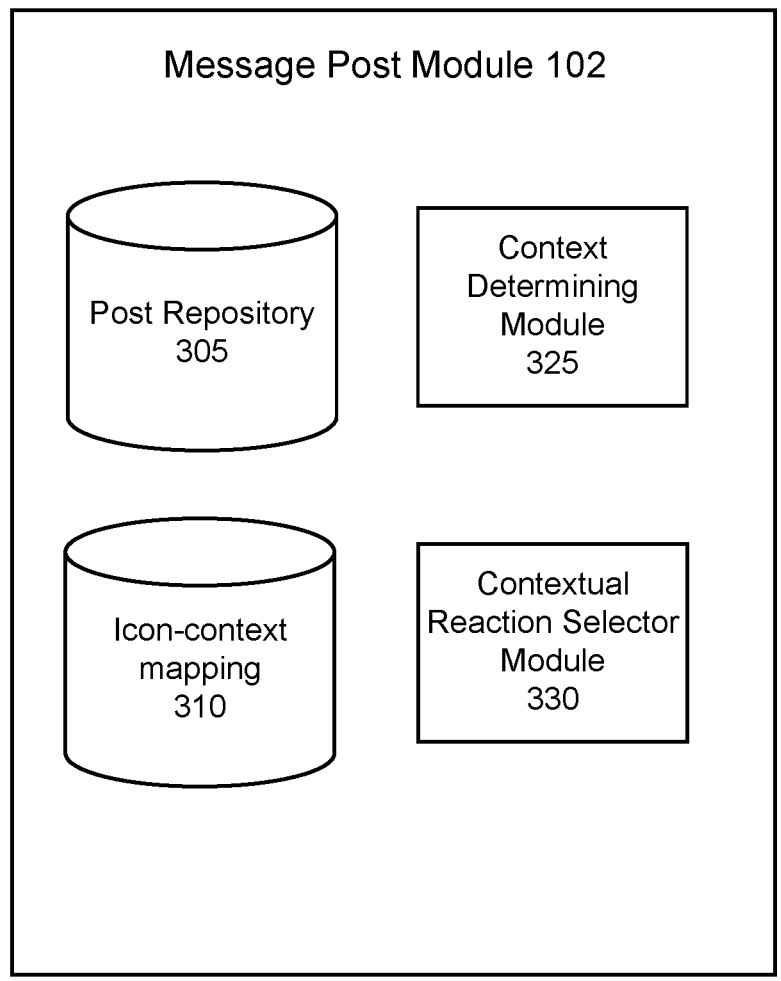
FIG. 3 is a block diagram of a message post module of the social networking system of FIG. 1, in accordance with an embodiment of the invention.
Figure 4:
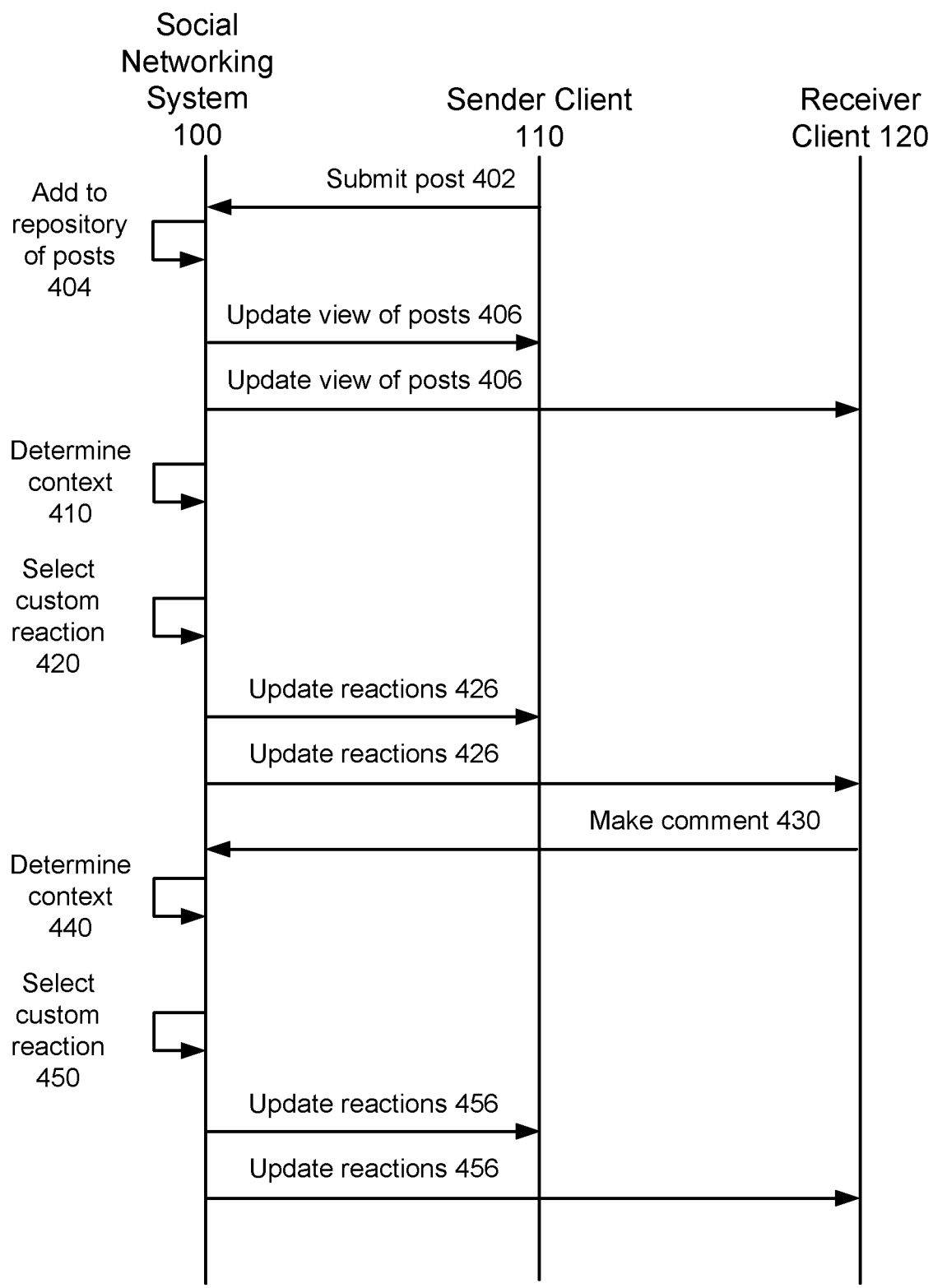
FIG. 4 is a sequence diagram of interactions between a social networking system, a sender client, and a receiver client, related to creating contextual reactions, in accordance to an embodiment of the invention.

Continuing the example, the content of the post is analyzed by the message post module 102, which is discussed at greater length with regard to FIGS. 3 and 4. The message post module 102 determines that a contextual reaction 232 corresponding to the label "basketball" is appropriate for this post 210. The contextual reaction 232 appears in the reaction options 236, as shown in the embodiment in FIG. 2B. In this example, the contextual reaction 232 might show a contextual reaction icon of a basketball. When a user designates (e.g., hovers over) the contextual reaction 232, a text descriptor appears that shows the reaction label "basketball." When a user selects the contextual reaction 232 to react to the post 210, the basketball icon has an animation of bouncing up and down.

The basketball contextual reaction adds to the quality of the social network experience. For example, a user may wish to react to their friend's post about basketball, but none of the standard reactions 234 captures the expression they wish to make. For example, another user may be a fan of the Chicago Bulls, who are a rival of the New York Knicks. The user may not wish to "like" the "Go Knicks!" post because they are not a fan of the Knicks. The user may also not wish to make an "angry" reaction because they are not angry per se with their friend who created the post. The "basketball" contextual reaction provides the user with the ability to make a reaction to acknowledge their friend's post without "liking" the Knicks or being "angry" with their friend.

In some embodiments, the content of the post can be associated with a context. A context represents a topic of the post, as derived from its content and/or associated data. The context has a corresponding graphical indicator (e.g., an icon, such as an image of a basketball for the topic of the sport of basketball), which includes features that visually illustrate (represent or refer to) the context. In some embodiments, the context also has a corresponding label, which is a textual representation of or reference to the context (e.g., the string "basketball"). The graphical indicator and/or label associated with the context can be used to present a reaction associated with the context. An embodiment of the use of context to create contextual reactions is described below with reference to FIG. 3.

FIG. 3 is a block diagram of a message post module 102 of the social networking system 100 of FIG. 1, in accordance with an embodiment of the invention. The message post system includes a post repository 305, an icon-context mapping 310, a context determining module 325, and a contextual reaction selector module 330. These components store and process posts made to the social networking system 100 in order to produce options for contextual reactions.

The post repository 305 contains posts made to the social networking system 100. The data contained about each post in the post repository 305 includes an indication of the user who made the post (e.g., a username or other unique identifier), the content of the post, such as text, images, and/or location referred to by the post, the comments on the post and the content associated with those comments, data about reactions to the post (including storing data about contextual reactions made to the post), such as the users who have reacted to the post and what reactions they made, data about the revision history of the post (i.e. whether it has been edited), the permissions of the post (i.e. which users of the social networking system can see which content included in the post), and other data relating to individual posts made in the social networking system.

The icon-context mapping 310 stores information relating particular contexts to specific pre-defined icons. Contexts represent a topic of a post, such as "basketball", "Hawaii", or "South African Penguin". In some embodiments, a post may have more than one associated context. In some embodiments, the contexts are arranged hierarchically, such as in a tree, with sub-contexts representing more specific topics than the topics of their parent contexts (e.g., the context "sports" having the sub-context "basketball"). Each context has one or more associated icons. Returning to the basketball game example from earlier, the context of the post may have an associated icon depicting a basketball. In some embodiments, the same icon may be associated with different contexts, such as an icon of Santa Claus being associated with both the context "Christmas" and "Santa Claus."

In some embodiments, the icon-context mappings 310 are specified manually, e.g., by employees of the organization responsible for the social networking system 100.

The context determining module 325 determines the context of a post at least in part based on the content included in the post. The content included in a post includes text, images, location data, and any other data associated with the post in the post repository 305.

In some embodiments, the context determining module 325 uses supervised machine learning to analyze the content of the post and determine one or more contexts associated with it. For example, in one embodiment, there is a predetermined set of possible contexts, each having one or more associated icons from a set of possible icons. The set of possible icons is made available for selection by users of the posts. (Selecting from the entire set of possible icons may require the user to use sub-menus, scrolling through lists, etc. to arrive at the desired icon, which is more cumbersome to a user than if presented with only the most applicable icons.) The content of the posts for which the users selected an associated icon serve as the positive training set for the context(s) associated with that icon. For example, content of posts for which users specified a particular basketball icon associated with the "basketball" context would serve as the positive training set for the "basketball" context. A supervised learning algorithm (e.g., a support vector machine) is applied to the training sets to derive a classifier model for the context(s). The trained classifier model can then be applied to a post to determine how strongly the post falls into the context corresponding to the classifier model. For example, a classifier model trained for the "basketball" context can be applied to a post to generate a score, the score indicating how well the post fits into the "basketball" context.

The contextual reaction selector module 330 determines the best contextual reaction or reactions for a post using the determined context, displaying them (for example) as the contextual reactions 232 of FIG. 2. For a post, the contextual reaction selector module 330 provides the post as input to the context determining module 325, obtains the resulting determined context(s) from the context determining module, and references the icon-context mapping 310 using that context(s) to determine a contextual reaction icon associated with the contextual reaction to include with the post. The contextual reaction selector module 330 can select more than one reaction to include with a post.

In some embodiments, the contextual reaction selector module 330 determines the contextual reactions for a post in part based on the user currently viewing the post. For example, in some embodiments the contextual reaction selector module 330 determines the contextual reactions using: the prior contextual reactions selected by the user (e.g., the user has selected a "basketball" contextual reaction many times in the past), the known preferences of the user from the user profile (e.g., that the user likes basketball), and/or prior contextual reactions or known preferences of connections of the user on the social networking system 100 (e.g., so that the user can more easily send messages appreciated by the user's friends).

Returning to the basketball example from earlier, the post about basketball is made by the user and is stored to the post repository 305. The context determining module 325 determines the context to be "basketball" based on the text, photo, location, and other data associated with the post that is stored in the post repository 305. The contextual reaction selector 330 takes the context of "basketball" and references the icon-context mapping 310, which maps the context of "basketball" to an icon of an animated basketball. The post is displayed on the user interface 200 of the social networking system, including the basketball contextual reaction 232 in the reaction options associated with the post.

In a related embodiment, the invention produces posts with multiple contextual reactions. For example, referring to the basketball example again, the context determining module 325 determines the context to be both "basketball" and "Knicks." In one embodiment, the contexts "basketball" and "Knicks" may both be mapped to an animated basketball icon in the icon-context mapping 310. The contextual reaction selector 330 does not repeat reactions for the same post. That is, in this case, the contextual reaction selector 330 would return only one contextual reaction with a basketball icon.

In the embodiment where "basketball" and "Knicks" map to two different icons in the icon-context mapping 310, the contextual reaction selector 330 would return two different contextual reactions. For example, the "Knicks" context may map to an icon of the team logo, with permission from the team. Having both the reactions of "basketball" and "Knicks" allows users to react to the post with the reaction that is most appropriate. As previously discussed, assume that another user of the social networking system who is a fan of the Bulls wants to react to their friend's post, but not show support for the Knicks. The "basketball" contextual reaction provides them with an appropriate reaction. However, for a different user that is a fan of the Knicks, the "Knicks" contextual reaction gives the opportunity to appropriately react to their friend's post by acknowledging support for both their friend and the Knicks team. Multiple context-specific contextual reactions allow multiple users to more easily make more appropriate and specific reactions to posts, thereby improving the social networking experience.

In another example, a user makes a post about food, including a picture of the user's lunch (a sandwich), without any accompanying text. The context determining module 325 analyzes the content of the post based on data of the post as stored in the post repository 305. Since there is no text in the post, the analysis is primarily an image analysis. The image analysis results in the context being determined to be "food." The contextual reaction selector module 330 takes the "food" context as input and references the icon-context mapping 310 to determine the icon(s) best associated with this context. The icon-context mapping maps the context "food" to an icon of an illustrated donut. The contextual reaction selector module returns the donut icon to be added to the reaction options for the post. Although the post does not contain a donut, either in text or picture form, the reaction icon can be a representation of a broader category associated with the post, in this example "food."

In another example, a user makes a post to the social networking system that includes a location tag indicating that the post pertains to the Golden Gate Bridge. In this embodiment of the invention, the context determining module 325 analyzes the post content, including the location, and determines the location to be within the context of the post. In this example, the Golden Gate Bridge context maps to an icon that is a graphic of the well-known red trusses of the Golden Gate Bridge. The Golden Gate Bridge reaction is added to reaction options available to users viewing the post.

In an embodiment of this example where the icon-context mapping 310 is not one-to-one, the Golden Gate Bridge icon may be mapped to multiple locations. Examples of locations that would also map to a Golden Gate Bridge icon include San Francisco as a whole, Golden Gate Park, the Presidio, and other nearby locations. In this embodiment, any post tagged at these locations or otherwise determined by the context determining module 325 to have context of these locations would have a contextual reaction of the Golden Gate Bridge icon.

FIG. 4 is a sequence diagram of interactions between a social networking system 100, a sender client 110, and a receiver client 120, related to creating contextual reactions, in accordance to an embodiment of the invention. For simplicity, the example shown in FIG. 4 only includes one receiver client 120.

The sender client 110 submits 402 a post which is sent to the social networking system 100 via the network 140, e.g., using a user interface provided by the social networking system 100. As noted above, the post may include data such as text, images, locations, and the like.

The post is added 404 to the repository of posts 305 of FIG. 3 by the social networking system 100. By adding 404 the post to the repository of posts, the post becomes accessible to the message post module 102.

The social networking system 100 causes updates 406 to the user view of posts via the network 140. Specifically, the social networking system 100 sends the received post out to users with permissions to view the post (e.g. friends or connections) and their client devices (e.g. the sender client 110 and receiver clients 120) render the post on an interface. The user interface presented to the sender client 110 and receiver client 120 may be similar to the mobile interface 200 shown in FIGS. 2A-2B.

Updates 406 are continuous as data is added or changed about the post. For example, if the sender client 110 edits the post to fix a typographic error in the text of the post, the view of the post is updated for both the sender client 110 and receiver client 120. Similarly, if the receiver client 120 makes a comment on the post, the view of the post is updated 406 for both the sender client 110 and receiver client 120.

The sever 100 determines 410 the context of the post using the message post module 102 shown in the embodiments of FIGS. 1 and 3. Specifically, determining 410 context is done by the context determining module 325 using methods previously discussed in relation to FIG. 3. The social networking system 100 selects 420 a contextual reaction for the post based on the determined context, e.g., using the contextual reaction selector module 330, previously discussed in reference to FIG. 3.

The social networking system 100 sends an update 426 of the reaction options to the sender client 110 and receiver client 120 so as to include the selected contextual reaction within the reaction options made available to users viewing the post using the user interface. Users of the social networking system 100 have the option to select the contextual reaction when reacting to the post. An example of the inclusion of the contextual reactions in the user interface can take the form of the embodiment shown in FIG. 2B, where item 232 is a contextual reaction.

The receiver client 120 makes 430 a comment on the post via the social networking system 100. The comment is sent to the social networking system 100, which stores the comment. When the comment is stored, the comment data is associated with both the original post and the receiver client 120 that submitted the comment. Users can react to and comment on (e.g. reply to) comments.

In the embodiment illustrated in FIG. 4, the social networking system 100 additionally provides contextual reactions for comments, as well as for original posts. Accordingly, the social networking system 100 determines 440 the context of the comment and selects 450 a contextual reaction based on the determined context of the comment. In this embodiment, the comment is indexed and analyzed the way a post would be. The comment adds content to the original post, and can be viewed as altering the context of the post. Analyzing comments to select appropriate contextual reactions for a post is important to improving the social networking experience, and thus in some embodiments comments to posts are analyzed by the context determining module 325 when determining the context(s) for a given post.

The social networking system 100 sends an update 456 of the reaction options to the sender client 110 and receiver client 120, based on the comment submitted at step 430. In one embodiment, the update 456 may alter the reaction options for the overall post. In another embodiment, the update 456 provides a contextual reaction for the individual comment only. Another embodiment allows both the individual comment and the original post to be updated 456 with a new contextual reaction.

Returning to the basketball example, the sender client 110 makes a post at a Knicks basketball game. In this embodiment, the example has multiple reactions, the basketball icon and an icon with the Knicks logo. A receiver client 120 who is a Bulls fan views the post and makes a comment 430 on the post that says "Go Bulls!" The social networking system 100 determines the context 440 of the comment to be "basketball" and "Bulls." The social networking system 100 selects contextual reactions 450 of icons of a basketball and the Chicago Bulls logo to be contextual reaction options for the comment. In this embodiment, the Bulls logo contextual reaction is also added to the original post. The system does not repeat reactions. That is, the basketball contextual reaction does not appear twice in the store of contextual reaction options on the original post. Now other users of the social networking system 100 who view the post and are fans of basketball can select a contextual reaction to show support for their favorite team, either the Knicks or the Bulls. Users can alternatively choose not to weigh in on the Bulls-Knicks rivalry and instead select a generic basketball contextual reaction. Updating the contextual reactions as comments are made on the post allows the social networking system 100 to provide relevant and engaging reaction options to users.

Figure 5:
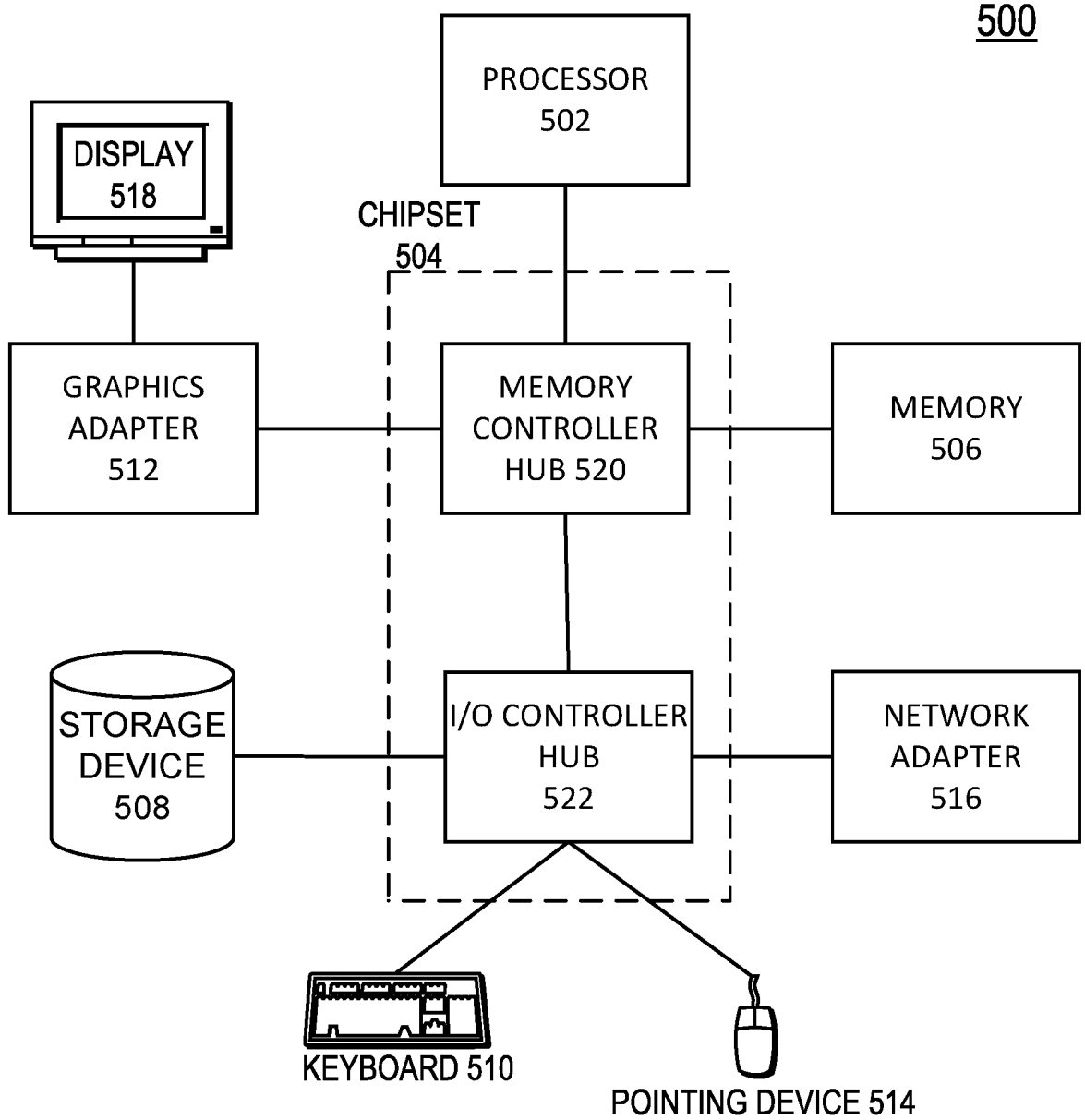
FIG. 5 is a high-level block diagram illustrating physical components of a computer used as part or all of the client device from FIG. 1, according to one embodiment.

FIG. 5 is a high-level block diagram illustrating physical components of a computer 500 used as part or all of the social networking system 100 and/or client devices 110 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522.

In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server, or a smartphone, may lack a graphics adapter 512, and/or display 518, as well as a keyboard or pointing device. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for making available contextual reactions for a social networking post, the computer-implemented method comprising:

receiving, by a social networking system, a post by a user of the social networking system, the post including one or more images and text provided by the user;

receiving a comment on the post from other users of the social networking system;

storing in a data structure, by the social networking system, data associated with the post, the data comprising the text and the one or more images of the post, the received comment, stored context associated with the post, and data associated with contextual reactions previously made to the post including user information associated with users who previously reacted to the post and reactions that the users previously made;

analyzing the stored data associated with the post;

based at least in part on the analysis, determining a plurality of contexts of the post, wherein each context of the plurality of contexts indicates a topic of the post, and wherein the contexts are arranged within a hierarchy in which contexts on a lower level represent more specific topics than the topics of contexts that are on a higher level;

based at least in part on the plurality of contexts, selecting, from a plurality of different levels of the hierarchy, a plurality of contextual reaction icons for the post wherein the plurality of contextual reaction icons include features that illustrate the plurality of contexts, and are different for different levels of contexts from the hierarchy;

storing the determined plurality of contexts of the post and the selected plurality of contextual reaction icons in the data structure associated with the post;

providing the post for display to other users of the social networking system, the post displayed with a plurality of reaction icons from which users can select, the plurality of reaction icons displayed outside of the text of the post, the reaction icons including the plurality of contextual reaction icons selected from the plurality of different levels of the hierarchy;

providing the comment for display with a plurality of contextual reaction icons from which users can select, the contextual reaction icons determined based on analysis of content of the comment;

receiving a selection of at least one of the other users of one of the plurality of the contextual reaction icons for the post, the selected contextual reaction icon recorded for the at least one of the other users as a reaction to the post; and receiving a selection of at least one of the plurality of the contextual reaction icons for the comment.

2. The computer-implemented method of claim 1, wherein the post is associated with a location, and wherein determining the context of the post is based at least in part on the location.

3. The computer-implemented method of claim 1, wherein the post further is associated with an event, and wherein determining the context of the post is based at least in part on the event.

4. The computer-implemented method of claim 1, wherein the analyzing comprises at least one of: computer vision, object recognition, or text mining.

5. The computer-implemented method of claim 1, wherein each context of the hierarchy is mapped to one or more contextual reaction icons.

6. The computer-implemented method of claim 1, wherein the determining of the context of the post is performed using a machine learned model, the machine learning comprising:

receiving a training set that contains a set of posts for which a user has already specified a contextual reaction icon;

determining the contexts of the posts based on the specified contextual reaction icons; and training the machine learned model by supplying the posts of the training set, and the determined contexts of the posts, as input to a supervised machine learning algorithm.

7. The computer-implemented method of claim 1, further comprising:
receiving a comment associated with the post from another user of the social networking system;
determining an updated context of the post based at least in part on the comment, the updated context of the post different from the context of the post previously determined; and
providing the post for display to other users of the social networking system, the plurality of reaction icons from which users can select including the updated contextual reaction icon.

8. The computer-implemented method of claim 1, wherein the contextual reaction icon is selected based at least in part on a user to whom the post is provided.

9. A non-transitory computer-readable storage medium storing instructions for execution on a computer processor, the instructions when executed performing actions comprising:
receiving, by a social networking system, a post by a user of the social networking system, the post including one or more images and text provided by the user;
receiving a comment on the post from other users of the social networking system;
storing in a data structure, by the social networking system, data associated with the post, the data comprising the text and the one or more images of the post, the received comment, stored context associated with the post, and data associated with contextual reactions previously made to the post including user information associated with users who previously reacted to the post and reactions that the users previously made;
analyzing the stored data associated with the post;
based at least in part on the analysis, determining a plurality of contexts of the post, wherein each context of the plurality of contexts indicates a topic of the post, and wherein the contexts are arranged within a hierarchy in which contexts on a lower level represent more specific topics than the topics of contexts that are on a higher level;
based at least in part on the plurality of contexts, selecting, from a plurality of different levels of the hierarchy, a plurality of contextual reaction icons for the post wherein the plurality of contextual reaction icons include features that illustrate the plurality of contexts, and are different for different levels of contexts from the hierarchy;
storing the determined plurality of contexts of the post and the selected plurality of contextual reaction icons in the data structure associated with the post;
providing the post for display to other users of the social networking system, the post displayed with a plurality of reaction icons from which users can select, the plurality of reaction icons displayed outside of the text of the post, the reaction icons including the plurality of contextual reaction icons selected from the plurality of different levels of the hierarchy;
providing the comment for display with a plurality of contextual reaction icons from which users can select, the contextual reaction icons determined based on analysis of content of the comment;
receiving a selection of at least one of the other users of one of the plurality of the contextual reaction icons for the post, the selected contextual reaction icon recorded for the at least one of the other users as a reaction to the post; and
receiving a selection of at least one of the plurality of the contextual reaction icons for the comment.

10. The non-transitory computer-readable storage medium of claim 9, wherein the post is associated with a location, and wherein determining the context of the post is based at least in part on the location.

11. The non-transitory computer-readable storage medium of claim 9, wherein the post further is associated with an event, and wherein determining the context of the post is based at least in part on the event.

12. The non-transitory computer-readable storage medium of claim 9, wherein the analyzing comprises at least one of: computer vision, object recognition, or text mining.

13. The non-transitory computer-readable storage medium of claim 9, wherein each context of the hierarchy is mapped to one or more contextual reaction icons.

14. The non-transitory computer-readable storage medium of claim 9, wherein the determining of the context of the post is performed using a machine learned model, the machine learning comprising:
receiving a training set that contains a set of posts for which a user has already specified a contextual reaction icon;
determining the contexts of the posts based on the specified contextual reaction icons; and
training the machine learned model by supplying the posts of the training set, and the determined contexts of the posts, as input to a supervised machine learning algorithm.

15. The non-transitory computer-readable storage medium of claim 9, the actions further comprising:
receiving a comment associated with the post from another user of the social networking system;
determining an updated context of the post based at least in part on the comment, the updated context of the post different from the context of the post previously determined; and
providing the post for display to other users of the social networking system, the plurality of reaction icons from which users can select including the updated contextual reaction icon.

16. The non-transitory computer-readable storage medium of claim 9, wherein the contextual reaction icon is selected based at least in part on a user to whom the post is provided.

17. A computer system comprising:
a computer processor; and
a non-transitory computer-readable storage medium storing instructions that when executed by the computer processor perform actions comprising:
receiving, by a social networking system, a post by a user of the social networking system, the post including one or more images and text provided by the user;
receiving a comment on the post from other users of the social networking system;
storing in a data structure, by the social networking system, data associated with the post, the data comprising the text and the one or more images of the post, the received comment, stored context associated with the post, and data associated with contextual reactions previously made to the post including user information associated with users who previously reacted to the post and reactions that the users previously made;
analyzing the stored data associated with the post;
based at least in part on the analysis, determining a plurality of contexts of the post, wherein each context of the plurality of contexts indicates a topic of the post, and wherein the contexts are arranged within a hierarchy in which contexts on a lower level represent more specific topics than the topics of contexts that are on a higher level;
based at least in part on the plurality of contexts, selecting, from a plurality of different levels of the hierarchy, a plurality of contextual reaction icons for the post wherein the plurality of contextual reaction icons include features that illustrate the plurality of contexts, and are different for different levels of contexts from the hierarchy;
storing the determined plurality of contexts of the post and the selected plurality of contextual reaction icons in the data structure associated with the post;
providing the post for display to other users of the social networking system, the post displayed with a plurality of reaction icons from which users can select, the plurality of reaction icons displayed outside of the text of the post, the reaction icons including the plurality of contextual reaction icons selected from the plurality of different levels of the hierarchy;
providing the comment for display with a plurality of contextual reaction icons from which users can select, the contextual reaction icons determined based on analysis of content of the comment;
receiving a selection of at least one of the other users of one of the plurality of the contextual reaction icons for the post, the selected contextual reaction icon recorded for the at least one of the other users as a reaction to the post; and
receiving a selection of at least one of the plurality of the contextual reaction icons for the comment.

18. The computer system of claim 17, the actions further comprising:
receiving a comment associated with the post from another user of the social networking system;
determining an updated context of the post based at least in part on the comment, the updated context of the post different from the context of the post previously determined; and
providing the post for display to other users of the social networking system, the plurality of reaction icons from which users can select including the updated contextual reaction icon.

\* \* \* \* \*